Patented Aug. 4, 1936

2,049,486

UNITED STATES PATENT OFFICE 2,049,486

SEPARATION OF DIMETHYL AND TRI-
METHYLAMINES BY DISTILLATION

Dale Friend Babcock, Wilmington, Del., assignor
to E. I. du Pont de Nemours & Company, Wilmington, Del., a corporation of Delaware Application April 19, 1933, Serial No. 666,810

23 Claims. (Cl. 202—42)

This invention relates to a distillation process of general application and it pertains particularly to the separation of pure trimethylamine and pure dimethylamine from methylamine mixtures.

This invention has for an object the distillation of mixtures containing compounds forming azeotropic or constant boiling mixtures, to obtain from said mixtures the individual components thereof in substantially the pure state. This invention has as a specific object the separation of pure trimethylamine or of pure dimethylamine from mixtures containing both tri- and dimethylamine. A further object is separation of pure dimethylamine from methylamine mixtures. Other objects will appear hereinafter.

Figure 1:
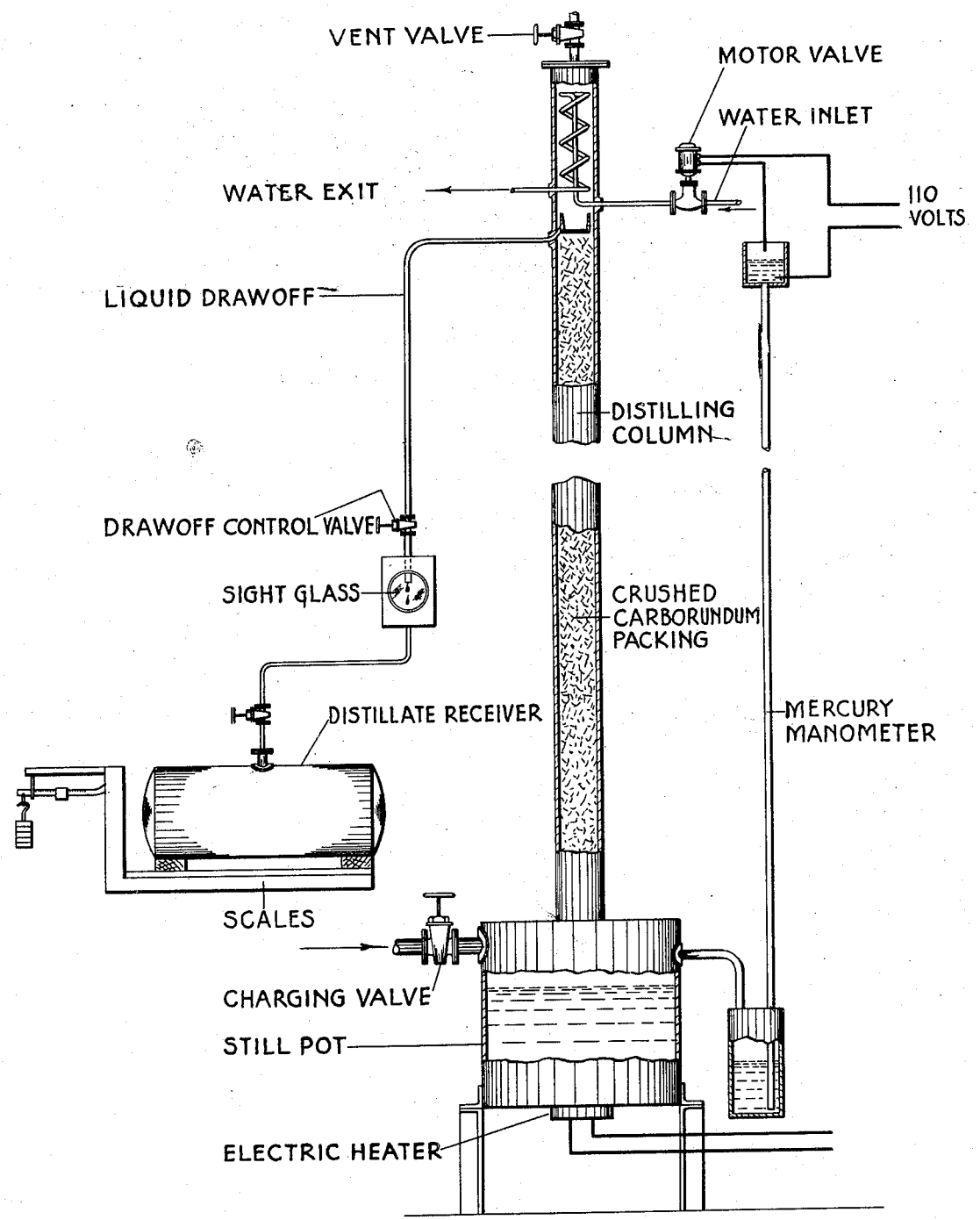
Figure 2:
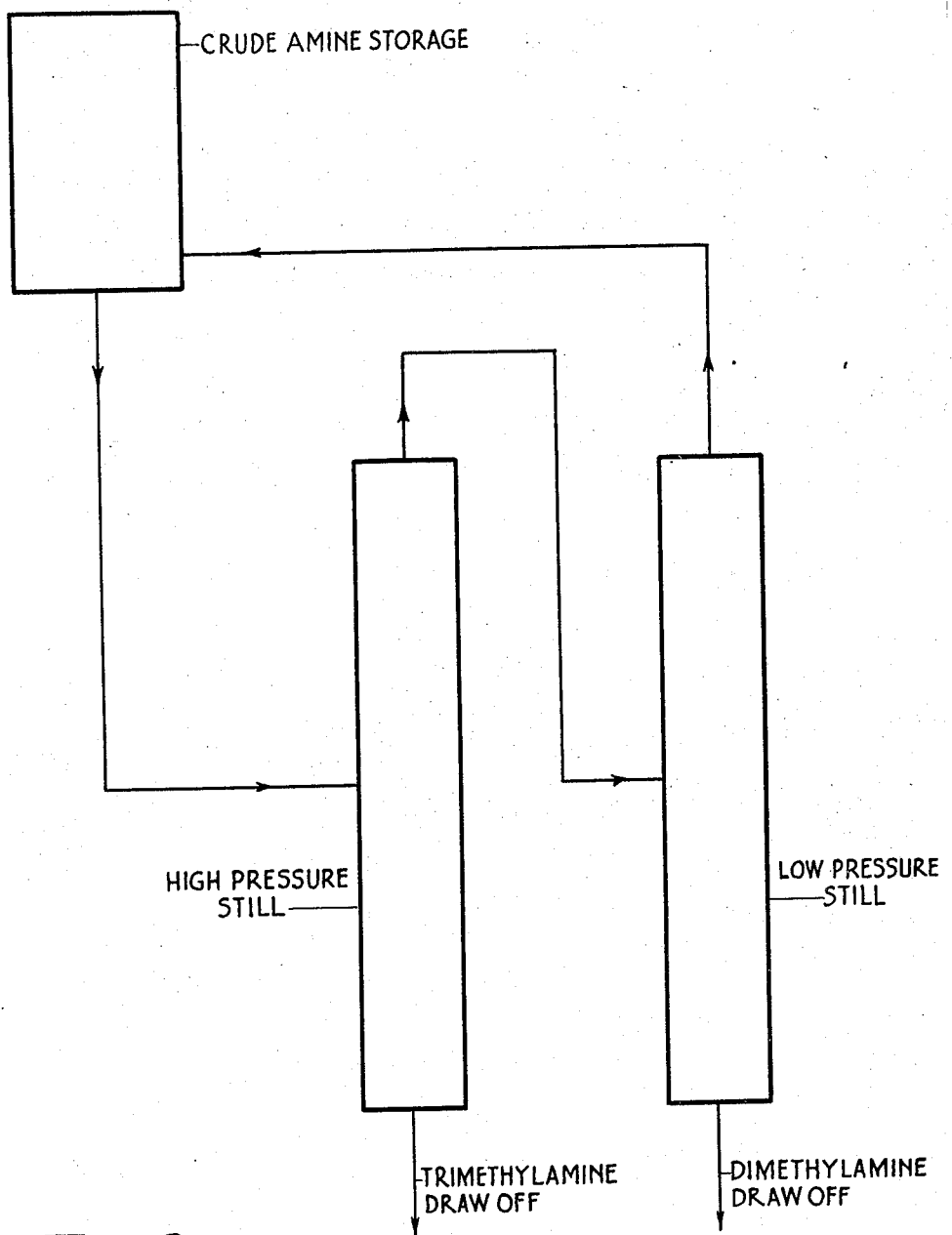
Figure 3:
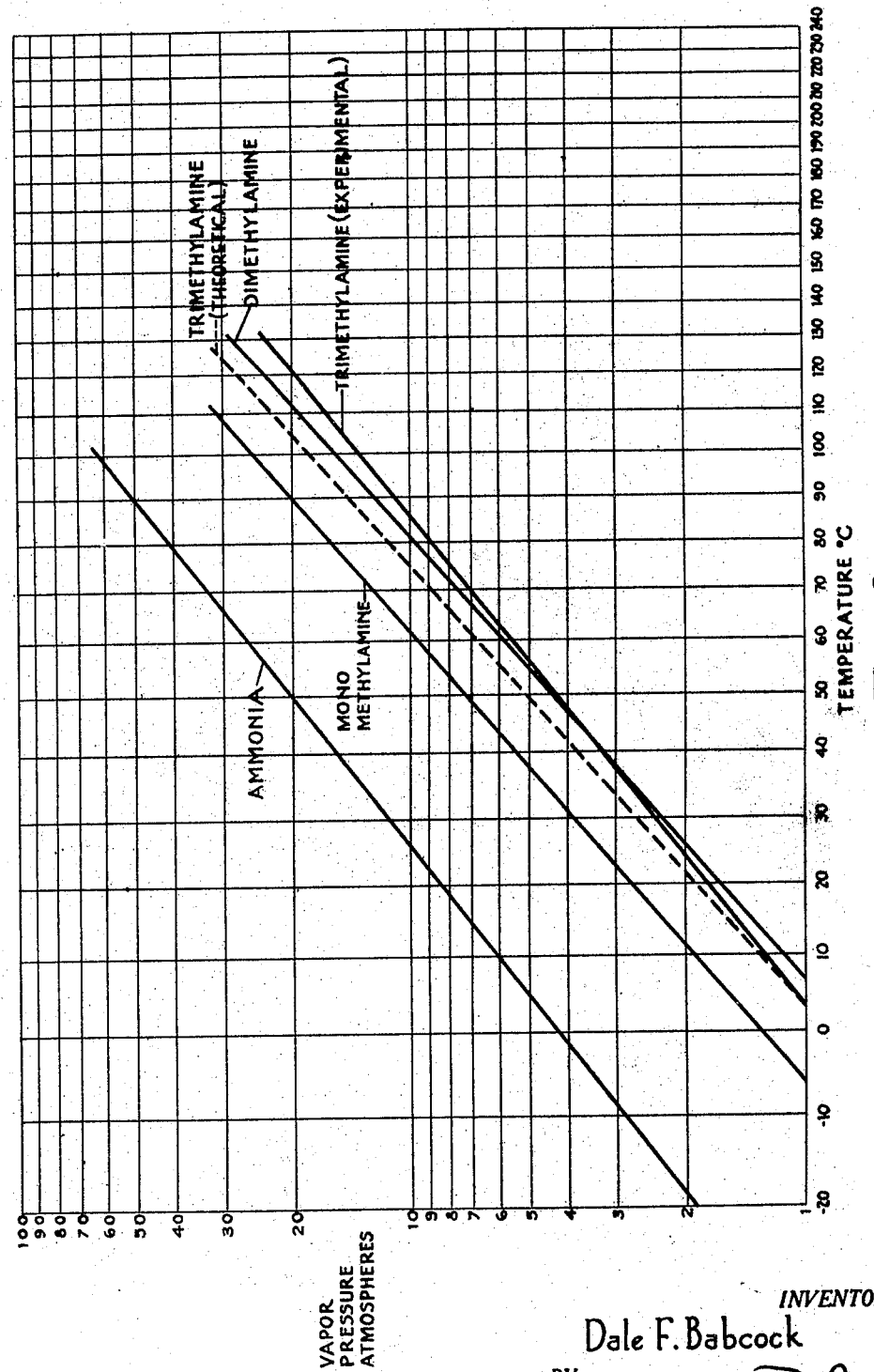

In the appended illustrative drawings, Figures 1 and 2 represent distillation apparatus adapted for use in the practice of the present invention, and Figure 3 represents vapor pressure curves of compounds to which the invention pertains.

In order to describe this invention more clearly the following discussion is given:

The vapor pressure curves of ammonia, mono- and dimethylamine as recorded in the literature are reproduced in the attached graph, (Figure 3); the vapor pressure curve of trimethylamine is not recorded in the literature. It is noticed that these curves are nearly parallel and intersect the one atmosphere isobar at the respective boiling points of the compounds. No abnormalities were to be expected in the vapor pressure of trimethylamine since the other physical properties of the three methylamines and ammonia are so similar. In other words, the vapor pressure of trimethylamine, by analogy, should be represented by a curve parallel to the other three, intersecting the one atmosphere isobar at the boiling point of trimethylamine. This expected vapor pressure curve is represented on the graph by the dash line. Consequently, trimethylamine would be expected to be more volatile than dimethylamine and less volatile than monomethylamine at all pressures.

The separation of di- and trimethylamine by distillation would require very careful fractionation under expected conditions since there is such a small difference in the boiling temperatures. However, careful fractionation should resolve the mixture into its pure components. The formation of an azeotropic mixture would not be expected since the two amines are so closely related chemically and the usual types of azeotropic mixtures are formed by substances widely different chemically.

It has been found, however, that when a mixture of approximately equal amounts of di- and trimethylamine is fractionated at atmospheric pressure, two constant boiling fractions are obtained, one boiling at +3° C. and the other at 6.8° C. The lower boiling fraction contains, instead of pure trimethylamine as expected, a mixture rich in trimethylamine but containing much dimethylamine. The higher boiling fraction is, as expected, dimethylamine of high purity.

If the above amine mixture is fractionated at a pressure of 100 lbs./sq. in., two constant boiling fractions are again obtained. The lower boiling fraction contains dimethylamine together with much trimethylamine. The higher boiling fraction, instead of being pure dimethylamine as expected, is trimethylamine of high purity.

From the above experimentally determined facts I can draw the following conclusions. First, di- and trimethylamine form an azeotropic mixture, the composition of which varies greatly as the pressure is changed. Secondly, the vapor pressure curves of these two amines are not parallel but cross at a pressure between one and seven atmospheres. Above this pressure dimethylamine is the lower boiling of the two, and below this pressure trimethylamine is the more volatile. The true vapor pressure curve of trimethylamine illustrating these features is shown by a solid line in Figure 3.

Since there is a great change in the composition of the azeotropic mixture as the pressure is changed, the following procedure offers a method of separating the two amines:

A mixture of trimethylamine and dimethylamine is fractionally distilled under any given pressure. This distillation produces two constant boiling amine fractions, the lower boiling fraction, termed fraction "A" being a mixture of trimethylamine and dimethylamine. The higher boiling fraction is either pure trimethylamine or dimethylamine depending on the distillation pressure and the composition of the original mixture.

Fraction "A" is redistilled at any pressure lower than the pressure of the first distillation. The lower boiling fraction, termed fraction "B", resulting from this distillation contains as before both trimethylamine and dimethylamine, but the concentration of trimethylamine in this fraction is greater than the trimethylamine concentration in fraction "A". This distillation produces a higher boiling fraction which is pure dimethylamine.

Fraction "B" is now redistilled at a higher pressure producing a low boiling fraction, termed fraction "C", containing both trimethylamine and dimethylamine, but less concentrated trimethylamine than fraction "B". The higher boiling fraction of this distillation is pure trimethylamine.

Fraction "C" is distilled at a low pressure and the cyclic process repeated.

Summarizing, the process comprises a higher pressure distillation in which an azeotropic mixture and pure trimethylamine are produced. The azeotropic mixture obtained in this distillation is redistilled at a lower pressure where a different azeotropic mixture and pure dimethylamine are produced.

If both distillations are carried out at a pressure substantially above 55 lbs./sq. in. the higher pressure distillation will separate two fractions boiling two to four degrees apart. The lower pressure distillation will separate two fractions boiling less than 0.5° C. apart. The difficulties are reversed if the two distillation pressures are below 55 lbs./sq. in. In this case the higher pressure distillation separates two fractions boiling less than 0.5° C. apart and the lower pressure distillation separates two fractions boiling nearly four degrees apart. For this reason it is preferred to carry out the high pressure distillation substantially above 55 lbs./sq. in. and the low pressure distillation substantially below this pressure.

The following examples illustrate representative modes for practicing the invention:

*Example 1.*—This experiment is an example of of a laboratory scale low pressure distillation for obtaining pure dimethylamine from dimethylamine-trimethylamine mixtures. The separation was incomplete, as distinct from that described in Examples 2 and 3.

In this experiment 230 cc. of nearly equal molar proportions of di- and trimethylamine was placed in a six foot glass distilling column and refluxed for an hour at atmospheric pressure. Eighty cc. of material was distilled over between 3.0° C. and 3.4° C. This material was an azeotropic mixture and contained 74% by weight trimethylamine, the remainder being dimethylamine. Between 3.4° C. and 6.8° C., seventy cc. of amine was distilled over having a dimethylamine concentration varying from 26% to 95%. Between 6.8° C. and 7.2° C., sixty cc. of 98–100% dimethylamine was obtained.

*Example 2.*—This experiment and that described in Example 3 are examples of the complete process operated discontinuously. The products prepared are pure di- and pure trimethylamine.

The distilling column used in this experiment and illustrated in Figure 1 was forty feet high, three inches in diameter and packed with crushed carborundum. A five gallon still pot, equipped with the necessary charging connections and an electric heater, was connected to the base of the column. The pressure of the distillation was automatically controlled by regulating the flow of cooling water to the condenser at the top of the column by means of a mercury monometer, one end of which opened into the still pot, and the end formed a contact to operate an electrical circuit containing a motor driven valve for controlling the inflow of water to the condenser. Liquid ammonia was used as a cooling media in the low pressure experiments.

The charging stock used in this distillation was obtained in the manufacture of methylamine by the reaction of methanol with ammonia over suitable catalysts, as described in H. R. Arnold U. S. Patent No. 1,799,722. This material had the following approximate analysis by weight:

| | Percent |
|---|---|
| Ammonia | 1 |
| Monomethylamine | 8 |
| Dimethylamine | 30 |
| Trimethylamine | 55 |
| Water, methanol, etc | 6 |

Sixteen kilograms of this material was charged into the previously described pressure distilling column and refluxed at an absolute pressure of 105 lbs./sq. in. until a steady state was obtained. This required about an hour. The small quantity of ammonia contained in the system was then vented through a vent valve at the top of the column. Two and four tenths kilograms of pure monomethylamine was distilled off at 50.4° C. and 1.2 kilograms of unanalyzed material distilled off between this temperature and 58° C. The distillations were led off to a receiver by means of a liquid drawoff line having a sight glass and controlled by a drawoff valve. Between 68° C. and 68.3° C., 2.7 kilograms of material was removed having an analysis of 27–31 mol per cent trimethylamine, the remainder being dimethylamine. The material remaining in the still pot was trimethylamine of high purity. The reflux ratio was 15:1.

The dimethylamine fraction obtained above, containing 27 to 31 mol per cent trimethylamine, was added to enough material of like composition to make 14 kg. This material was charged into the still pot after removal of the residual trimethylamine and was then refluxed for an hour at atmospheric pressure.

Five kilograms of amines were distilled over boiling between 3° C. and 3.1° C. This material contained 68 to 70 mol per cent trimethylamine, the remainder being dimethylamine. Between 6.8° and 6.9° C. 1.5 kilograms of material was obtained having an analysis of 99% dimethylamine. The reflux ratio was 15:1.

*Example 3.*—Fourteen kilograms of the crude di-trimethylamine mixture described in the preceding example was charged into the still described in Example 2 and refluxed at 75 lbs./sq. in. for one hour. A small amount of monomethylamine was distilled off without weighing. Two and three tenths kilograms of material, distilled off between 52.5° C. and 52.8° C. was not analyzed. Two and four tenths kilograms of material was distilled off between 55° C. and 55.2° C. which contained 98 to 100% trimethylamine.

The material boiling between 55° C. and 55.2° C. obtained above was added to 6 kg. of amine having similar composition and obtained from previous distillations and refluxed for one hour at atmospheric pressure. Three kilograms of material was distilled over between 3° C. and 6.7° C. This material was not analyzed. Between 6.7° C. and 6.8° C. five kilograms of 99% dimethylamine was obtained. The reflux ratio was 13:1.

*Example 4.*—In the following experiment the apparatus illustrated by the flow sheet in Figure 2 was used, the experiment illustrating a continuous process for practicing the invention.

One hundred pounds of crude amines having an approximate analysis of 60% tri- and 40% dimethylamine was pumped from a storage reservoir into a high pressure distilling column hourly. This crude amine was pumped under pressure by means of a pump through a valve-controlled inlet line leading from the storage tank to the still. The pressure on this column was automatically controlled at 122 lbs./sq. in. by regulating the flow of cooling water as in Example 2. Maintaining a high reflux as described in Example 2 about 45 pounds of 95% to 100% trimethylamine was drawn from the bottom of this column every hour through a valve controlled drawoff line leading from the bottom of the still. About 55 lbs. an hour of liquid distillate was expanded from the high pressure still into a second distilling column operated under a lower pressure. The temperature of the distillate was 73.2° C. and had an average composition of 27% to 29% tri- and 71% to 73% dimethylamine.

The low pressure distilling column was operated at atmospheric pressure. From the base of this column about 35 pounds of pure dimethylamine was obtained every hour at a temperature of 8° C., and was drawn off through a valve controlled drawoff line. Twenty pounds of distillate from the low pressure still was pumped into the storage reservoir from the condenser every hour. The temperature of the vapor distillate before condensation was 3.1° C. and had an average composition of 75% tri- and 25% dimethylamine.

The preferred range for the high pressure distillation is between 75 and 250 lbs./sq. in. The preferred range for the low pressure distillation is 15 to 25 lbs./sq. in. absolute, however, any pressure lower than that used in the high pressure distillation would still be operative.

The theoretical upper limit of the distillation pressure is the critical pressure of the mixture which is about 1500 lbs./sq. in. The separation becomes progressively more difficult as the pressure is raised above a few hundred pounds per sq. in. At and above the critical pressure distillation is impossible. There is no theoretical lower limit for the distillation pressure.

The charging stock for the amine distillation is preferably a mixture of only trimethylamine and dimethylamine. However, such impurities as ammonia, monomethylamine, methyl alcohol, water, etc., may be present in large amounts.

If ammonia, monomethylamine or other materials lower boiling than trimethylamine are present they would be vented or removed by distillation as low boiling fractions.

The separation of the methylamines by distillation has not been reported in the literature. However, the methylamines have been separated by fractional crystallization of the amine hydrochlorides. This separation involves the following steps: First, the neutralization of the amine with acid; second, the fractional crystallization, and finally the liberation of the amine with alkali. The invention herein described provides a method whereby the free amines may be separated into pure compounds without intermediate operations with their attendant high materials and labor costs.

This invention is based on two unexpected discoveries: First, the formation at all pressures of an azeotropic mixture between di- and trimethylamine, and second, the crossing of the vapor pressure curves of di- and trimethylamine at a pressure of about 55 lbs./sq. in. These two discoveries, together with the changing of the composition of the azeotropic mixture with pressure, form the theoretical basis for this invention.

The pressures referred to herein are absolute pressures.

The above description and examples are to be taken as illustrative only and not as limiting the scope of the invention. Any modification or variation therefrom which conforms to the spirit of the invention is intended to be included within the scope of the claims.

I claim:
1. In the process of separating dimethylamine and trimethylamine from mixtures containing said amines in such proportions that these two ingredients remain after any of the components which are more volatile distill off, the steps which comprises factionally distilling the said mixture at a given pressure until an azeotropic mixture of dimethylamine and trimethylamine has been evolved, then subjecting said azeotropic mixture to further fractional distillation at a pressure different from that used in the first distillation step.

2. The process of separating dimethylamine and trimethylamine from a mixture containing said amines in such proportions that these two ingredients remain after any of the components which are more volatile distill off which comprises fractionally distilling said mixture under a given pressure until an azeotropic mixture of dimethylamine and trimethylamine has been evolved, then fractionally distilling said azeotropic mixture at a higher pressure than that used in the first distillation step to obtain an azeotropic mixture containing a lower content of trimethylamine than that contained in the first azeotropic mixture.

3. The process of separating dimethylamine and trimethylamine from a mixture containing said amines in such proportions that these two ingredients remain after any of the components which are more volatile distill off which comprises fractionally distilling said mixture at a given pressure, until an azeotropic mixture of dimethylamine and trimethylamine has been obtained, then fractionally distilling said azeotropic mixture at a lower pressure than that used in the first distillation to obtain an azeotropic mixture containing a lower content of dimethylamine than that contained in the first azeotropic mixture.

4. The process of claim 2 in which the pressure used during the first distillation is substantially below 55 lbs./sq. in. absolute and the pressure used during the second step is substantially above 55 lbs./sq. in. absolute.

5. The process of claim 3 in which the pressure used during the first distillation is substantially above 55 lbs./sq. in. absolute and the pressure used during the second step is substantially below 55 lbs./sq. in. absolute.

6. A continuous process for the separation of dimethylamine and trimethylamine from mixtures containing said amines in such proportions that these two ingredients remain after any of the components which are more volatile distill off which comprises fractionating said mixtures containing both dimethylamine and trimethylamine in separate distillation zones which are maintained under different pressures, and introducing in each of said zones the distillate evolved from the other of said zones.

7. The process of claim 6 in which one distillation zone operates under a pressure substantially greater than 55 lbs./sq. in. absolute and the other distillation zone operates under a pressure substantially less than 55 lbs./sq. in. absolute.

8. The process of separating substantially pure trimethylamine from a mixture containing dimethylamine and trimethylamine in such proportions that these two ingredients remain after any of the components which are more volatile distill off, said mixture having trimethylamine in excess of the azeotropic mixture of these two amines obtained at the pressure used in the following distillation step, which comprises fractionally distilling said first named mixture and continuing said distillation until trimethylamine is separated in substantially pure form.

9. The process of separating substantially pure dimethylamine from a mixture containing dimethylamine and trimethylamine in such proportions that these two ingredients remain after any of the components which are more volatile distill off, said mixture having dimethylamine in excess of the azeotropic mixture of these two amines obtained at the pressure used in the following distillation step, which comprises fractionally distilling said first named mixture and continuing said distillation until dimethylamine is separated in substantially pure form.

10. The process of separating dimethylamine from a mixture with trimethylamine in which the latter predominates by weight, said mixture containing these two amines as its most volatile components, comprising the step of distilling the mixture at a pressure above 55 pounds per square inch absolute.

11. The process of separating dimethylamine from a mixture with trimethylamine in which the latter predominates by weight, comprising the steps of distilling the mixture at a pressure at which trimethylamine is retained in the still and a distillate comprising an azeotropic mixture of dimethylamine and trimethylamine is obtained, collecting the azeotropic mixture distilled off and distilling the latter again at a lower pressure.

12. The process of separating dimethylamine from a mixture with trimethylamine in which the latter predominates by weight, comprising the steps of distilling the mixture at a pressure above 55 pounds per square inch absolute to distill off an azeotropic mixture of said two amines and leave behind trimethylamine; and then distilling the said azeotropic mixture at a pressure lower than the foregoing to distill off another azeotropic mixture of said two amines and leave behind dimethylamine.

13. The process of separating dimethylamine from a mixture with trimethylamine in which the latter predominates by weight, comprising the steps of distilling the mixture at a pressure above 55 pounds per square inch absolute to distill off an azeotropic mixture of said two amines and leave behind trimethylamine; combining said azeotropic mixture so obtained with other azeotropic mixtures of said two amines having a preponderating proportion of dimethylamine, and then distilling said mixtures at a pressure below 55 pounds per square inch absolute to distill off another azeotropic mixture of said two amines and leave behind dimethylamine.

14. The process of separating dimethylamine from a mixture with trimethylamine in which the latter predominates by weight, comprising the steps of distilling the mixture at a pressure above 55 pounds per square inch absolute to distill off an azeotropic mixture of said two amines and leave behind trimethylamine; again distilling the said azeotropic mixture at a pressure below 55 pounds per square inch absolute; to distill off another azeotropic mixture of said two amines and leave behind dimethylamine, and in a similar manner continuing the process to effect a complete separation.

15. The process of separating dimethylamine from a mixture with trimethylamine in which the latter predominates by weight, comprising the steps of distilling the mixture at a pressure between 75 and 250 pounds per square inch absolute to distill off the azeotropic mixture of said two amines and leave behind trimethylamine; again distilling the said azeotropic mixture at a pressure between 15 and 25 pounds per square inch absolute to distill off another azeotropic mixture of said two amines and leave behind dimethylamine, and in a similar manner continuing the process to effect a complete separation.

16. The process of separating dimethylamine from a mixture with trimethylamine in which the former predominates by weight, said mixture containing these two amines as its most volatile components, comprising the step of distilling the mixture at a pressure below 55 pounds per square inch absolute.

17. The process of separating dimethylamine from a mixture with trimethylamine in which the former predominates by weight and in which said amines are in such proportions that these two ingredients remain after any of the components which are more volatile distill off, comprising the steps of distilling the mixture at a pressure at which dimethylamine is retained in the still and a distillate comprising an azeotropic mixture of dimethylamine and trimethylamine is obtained, collecting the azeotropic mixture distilled off and distilling the latter again at a higher pressure.

18. The process of separating dimethylamine from a mixture with trimethylamine in which the former predominates by weight and in which said amines are in such proportions that these two ingredients remain after any of the components which are more volatile distill off, comprising the steps of distilling the mixture at a pressure below 55 pounds per square inch absolute to distill off an azeotropic mixture of said two amines and leave behind dimethylamine; and then distilling the said azeotropic mixture at a pressure higher than the foregoing to distill off another azeotropic mixture of said two amines and leave behind trimethylamine.

19. The process of separating dimethylamine from a mixture with trimethylamine in which the former predominates by weight and in which said amines are in such proportions that these two ingredients remain after any of the components which are more volatile distill off, comprising the steps of distilling the mixture at a pressure below 55 pounds per square inch absolute to distill off an azeotropic mixture of said two amines and leave behind dimethylamine; combining said azeotropic mixture so obtained with other azeotropic mixtures of these two amines having a preponderating proportion of trimethylamine, and then distilling said mixtures at a pressure above 55 pounds per square inch absolute to distill off another azeotropic mixture of said two amines and leave behind trimethylamine.

20. A continuous process for the separation of dimethylamine and trimethylamine from mixtures containing these two amines as the most volatile components, said process comprising the steps of fractionating these mixtures containing dimethylamine and trimethylamine in zones maintained under different pressures and then introducing into each of said zones the distillate from the other of said zones.

21. The process in accordance with claim 8 characterized in that the mixture being distilled contains dimethylamine and trimethylamine as its most volatile components.

22. The process in accordance with claim 9 characterized in that the mixture being distilled contains dimethylamine and trimethylamine as its most volatile components.

23. A process for the separation of dimethyl and trimethylamines from mixtures containing these two amines as the most volatile components, said process comprising the step of fractionating the mixture containing dimethyl and trimethylamines and redistilling the distillate at a pressure different from that originally employed.

DALE FRIEND BABCOCK.